(12) United States Patent
Tucker

(10) Patent No.: US 8,135,959 B2
(45) Date of Patent: *Mar. 13, 2012

(54) EXTERNAL KEY TO PROVIDE PROTECTION TO DEVICES

(75) Inventor: James L. Tucker, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 1741 days.

This patent is subject to a terminal disclaimer.

(21) Appl. No.: 11/400,694

(22) Filed: Apr. 7, 2006

(65) Prior Publication Data

US 2007/0239995 A1 Oct. 11, 2007

(51) Int. Cl.
*G06F 12/14* (2006.01)
(52) U.S. Cl. ........ 713/189; 713/168; 713/182; 713/185; 726/2; 380/277; 380/30
(58) Field of Classification Search ............... 713/189
See application file for complete search history.

(56) References Cited

U.S. PATENT DOCUMENTS

| | | | | |
|---|---|---|---|---|
| 5,526,311 | A * | 6/1996 | Kreifels et al. | 365/201 |
| 6,366,117 | B1 * | 4/2002 | Pang et al. | 326/38 |
| 6,523,099 | B1 * | 2/2003 | Namekawa | 711/163 |
| 6,711,708 | B1 * | 3/2004 | Shimomura | 714/727 |
| 7,436,297 | B1 * | 10/2008 | Tucker | 340/541 |
| 2001/0010080 | A1 * | 7/2001 | Walter et al. | 713/202 |
| 2003/0140291 | A1 * | 7/2003 | Brown et al. | 714/724 |
| 2003/0159036 | A1 * | 8/2003 | Walmsley et al. | 713/168 |
| 2004/0222305 | A1 * | 11/2004 | Leaming | 235/492 |
| 2005/0097416 | A1 * | 5/2005 | Plunkett | 714/727 |
| 2005/0149745 | A1 * | 7/2005 | Ishidoshiro | 713/189 |
| 2006/0131691 | A1 * | 6/2006 | Roozeboom et al. | 257/534 |
| 2007/0192874 | A1 * | 8/2007 | Tucker | 726/27 |

FOREIGN PATENT DOCUMENTS

EP 1785905 A1 * 5/2007

* cited by examiner

*Primary Examiner* — Kambiz Zand
*Assistant Examiner* — Yonas Bayou
(74) *Attorney, Agent, or Firm* — Fogg & Powers LLC

(57) ABSTRACT

An external key device including a test access port connector adapted to mate with a test access port, a test equipment connector adapted to communicatively couple to test equipment, and an external encryption chip adapted to communicate signals through the test access port to an internal encryption chip. The internal encryption chip at least one of decrypts at least one test data input from the external encryption chip based on a password shared by the external encryption chip and the internal encryption chip and encrypts at least one test data output from a protected device. The external encryption chip at least one of decrypts at least one test data output from the protected device based on the shared password and encrypts at least one test data input generated by the test equipment.

20 Claims, 7 Drawing Sheets

US 8,135,959 B2

EXTERNAL KEY TO PROVIDE PROTECTION TO DEVICES

GOVERNMENT LICENSE RIGHTS

The U.S. Government may have certain rights in the present invention as provided for by the terms of Government Contract # FA8650-04-C-8011 with the USAF.

BACKGROUND

In some applications, a manufacturer or designer of electronics equipment wishes to prevent third parties from reverse engineering such equipment. The manufacturer or designer of electronics equipment often tries to prevent reverse engineering at the unit or system level, the board level, the component level or the chassis level or all of the above.

Some reverse-engineering techniques access electronics by communicating with a housed device using externally accessible interfaces. A debug or test port is typically designed to provide a mechanism by which an external device is able to inspect and change the state of various items of electronics that are internally housed in a chassis, integrated circuit housing and/or a multi-chip-module. For example, an external device can inspect and/or change the state of registers, memory or I/O interfaces of the internally housed device via a debug port or test port. Thus in some cases, a debug port or test port can be exploited to reverse engineer internally housed devices and/or chips.

The electrical systems within manufactured products often include proprietary designs. In some cases the board and/or chip manufacturers integrate the board and/or chip into systems, test the system via a test port and then sell the system to a customer. The test port or debug port is available to the customer that purchased the system.

In other cases, the board and/or chip manufacturers provide customers with a test access port that the customer uses to integrate the board and/or chip into their system. Once the customer has integrated their system, they may sell the system to yet another customer.

To facilitate the test and integration of digital integrated circuits, the Joint Test Access Group (JTAG) has developed the Institute of Electrical and Electronics Engineers (IEEE) 1149.1 standard that defines a standard test access port and boundary-scan architecture for digital integrated circuits and for the digital portion of mixed analog/digital integrated circuits. The IEEE 1532 standard extends the IEEE 1149.1 standard to support programmable devices. Both standards provide in-system monitoring of logic states and access of boundary scan addressable memory contents. The capabilities of the JTAG interface port can be used by reverse engineers to probe the chips and boards to obtain the proprietary information about design and/or operation of the probed chips and boards.

If the information that a reverse engineer obtains by reverse engineering proprietary boards and/or chips is related to advanced military applications, the information leak may endanger national security. If the information that a reverse engineer obtains by reverse engineering proprietary boards and/or chips is related to commercial applications, the information leak could be used to undermine the economic security of the commercial vendor.

For the reasons stated above and for other reasons stated below which will become apparent to those skilled in the art upon reading and understanding the specification, there is a need in the art to limit access to proprietary boards and chips via a test access port to authorized personnel.

SUMMARY

One aspect of the present invention provides an external key device including a test access port connector adapted to mate with a test access port, a test equipment connector adapted to communicatively couple to test equipment, and an external encryption chip adapted to communicate signals through the test access port to an internal encryption chip. The internal encryption chip at least one of decrypts at least one test data input from the external encryption chip based on a password shared by the external encryption chip and the internal encryption chip and encrypts at least one test data output from a protected device. The external encryption chip at least one of decrypts at least one test data output from the protected device based on the shared password and encrypts at least one test data input generated by the test equipment.

Another aspect of the present invention provides a system to protect a protected device and to monitor an internal system. The system includes a test access port communicatively coupled to an external encryption chip in an external key device, and an internal key device including an internal encryption chip. The internal encryption chip is communicatively coupled to the protected device and the external encryption chip. Test equipment is communicatively coupled to the protected device if the internal encryption chip and the external encryption chip share at least a password.

Another aspect of the present invention provides a method to control access to an internal system and at least one protected device through a joint test access group (JTAG) port. The method includes receiving test data input generated by test equipment at an internal encryption chip via the joint test access group (JTAG) port, inputting the test data input to the at least one protected device, receiving test data output from the protected device and outputting the test data output to the external encryption chip via the joint test access group (JTAG) port. The internal encryption chip at least one of decrypts at least one test data input from the external encryption chip based on a password shared by the external encryption chip and the internal encryption chip and encrypts at least one test data output from the protected device. The external encryption chip at least one of decrypts at least one test data output from the protected device based on the shared password and encrypts at least one test data input generated by the test equipment.

DRAWINGS

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
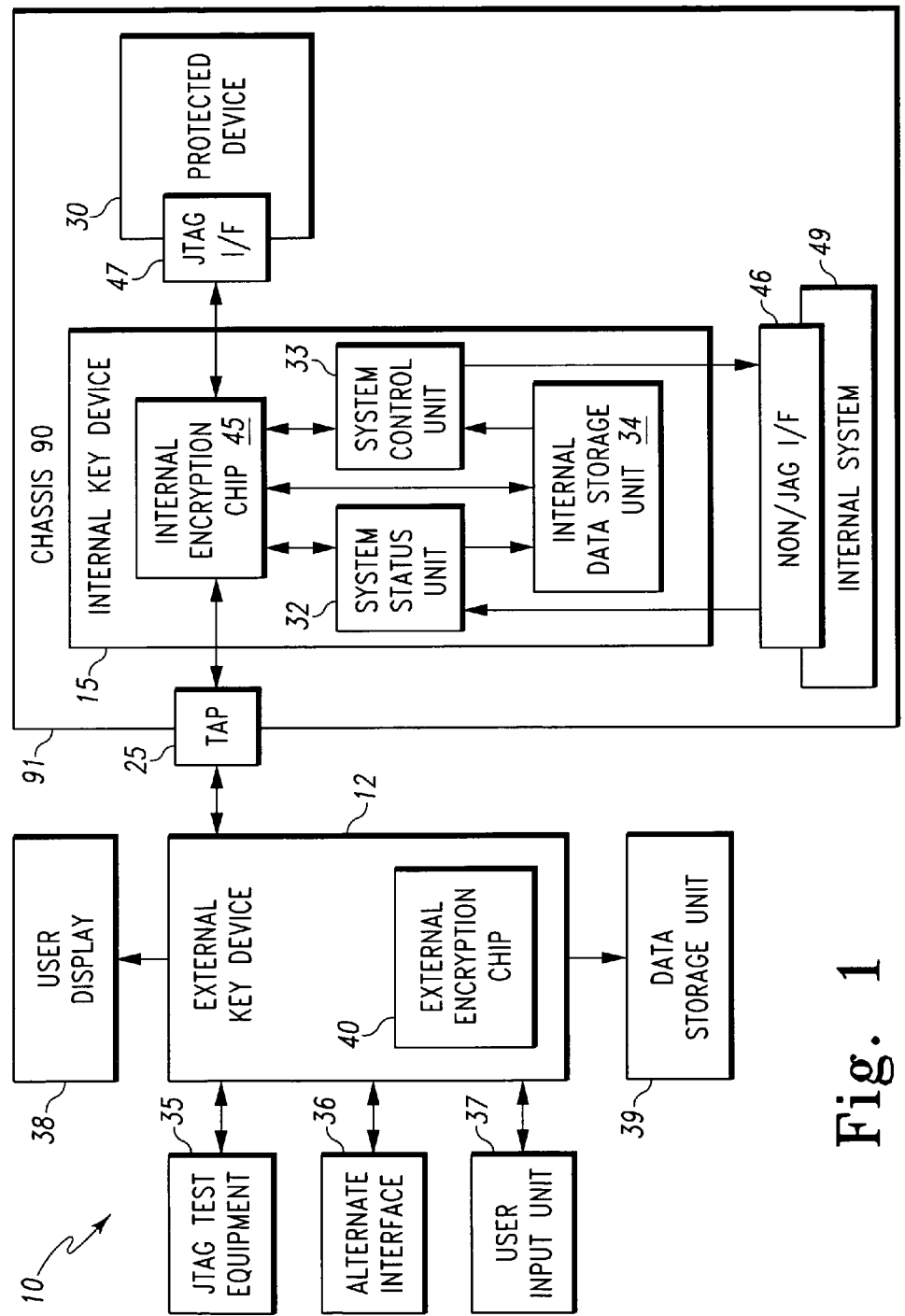
FIG. 1 is a block diagram of one embodiment of a system to protect a protected device and to monitor and to store system status of an internal system.

FIG. 1 is a block diagram of one embodiment of a system 10 to protect a protected device 30 and to monitor and to store system status of an internal system 49. The system 10 includes an external key device 12, a test access port 25, an internal key device 15, joint test access group (JTAG) test equipment 35, an internal system 49 and a protected device 30. The internal key device 15 includes an internal encryption chip 45, which is an electronic device or chip that includes one or more processors to encrypt and/or decrypt data. The external key device 12 includes an external encryption chip 40, which is an electronic device or chip that encrypts and/or decrypts data. The joint test access group (JTAG) test equipment 35 is also referred to here as "test equipment 35."

As shown in FIG. 1, the internal key device 15, the protected device 30, and the internal system 49 are enclosed in a chassis 90. System 10 implements the external key device 12 and the internal key device 15 to permit authorized users to check the status of secured enclosures such as chassis 90, to issue control signals to the protected device 30 and the internal system 49, and to lock and unlock the chassis 90.

The system 10 additionally includes an alternate interface 36, a user input unit 37, a user display 38, and a data storage unit 39, which are all external to the chassis 90 and communicatively coupled to the external key device 12. The internal key device 15 additionally includes a system status unit 32, a system control unit 33, and an internal data storage unit 34.

The internal encryption chip 45 receives test data signals and monitor data signals. The internal encryption chip 45 inputs monitor data input to the internal system 49 via the non/JTAG interface 46 and receives the monitor data output from the internal system 49 via the non/JTAG interface 46. The internal encryption chip 45 inputs the test data input to the protected device 30 and receives test data output from the protected device via the interface port 47.

As referred to herein, test data input signals include signals requesting that a test be performed on one or more protected devices 30. As referred to herein, monitor data input signals include signals requesting input from the system status unit 32, signals providing control instructions to the system control unit 33 and/or signals to store data regarding the internal system 49 in the internal data storage unit 34. The monitor data input signals also providing control instructions to implement a functional change in the operation of the internal system 49, the system status unit 32, the system control unit 33 and/or the internal data storage unit 34, and the like.

The system status unit 32 is communicatively coupled to the internal encryption chip 45. The system status unit 32 provides output monitor data that is output from the internal system 49 to the internal encryption chip 45. The system control unit 33 is communicatively coupled to the internal encryption chip 45. The system control unit 33 provides monitor data to the internal system 49. The internal data storage unit 34 is communicatively coupled to the internal encryption chip 45, the system status unit 32, and the system control unit 33. The internal data storage unit 34 stores monitor data received from the system status unit 32, the internal encryption chip 45 and the system control unit 33.

The test access port 25 provides a communication interface between the external key device 12 external to the chassis 90 and the internal key device 15 internal to the chassis 90. The test access port 25 extends through surface 91 of chassis 90. Thus, the test access port 25 communicatively couples the internal key device 15 to the external key device 12. The internal key device 15 is communicatively coupled to the protected device 30 and the internal system 49. The external key device 12 is communicatively coupled to the test equipment 35 and the internal system 49 via the internal key device 15.

In one implementation of this embodiment, if the internal encryption chip 45 and the external encryption chip 40 share at least a password, the test equipment 35 is communicatively coupled to at least one of protected device 30 and the user input unit 37, the data storage unit 39 and the user display 38 are communicatively coupled to the internal system 49.

In another implementation of this embodiment, if the internal encryption chip 45 and the external encryption chip 40 do not share at least a password, the test equipment 35 is not communicatively coupled to any protected devices 30 and the user input unit 37, the data storage unit 39 and the user display 38 are communicatively coupled to the internal system 49.

The alternate interface 36 is an interface other than the JTAG interface. The alternate interface 36 includes one or more interfaces used to communicatively couple to a computer such as universal serial bus (USB) port, FireWire port, RS232 port, parallel ports, serial ports, and the like. In one implementation of this embodiment, the alternate interface 36 permits access to the internal key device 15 from a laptop computer. The user input unit 37 is communicatively coupled to the external encryption chip 40 in the external key device 12. The user input unit 37 provides input to the internal encryption chip 45 in the internal key device 15 via the test access port 25. The user input unit 37 includes devices for inputting data, such as one or more buttons, one or more keypads, one or more switches, and one or more memory cards.

The user display 38 is communicatively coupled to the external encryption chip 40 to display output received from the internal encryption chip 45. The data storage unit 39 is communicatively coupled to the external encryption chip 40. The data storage unit 39 stores output received from the internal key device 15. In one implementation of this embodiment, the data storage unit 39 is a removable memory stick or removable smart card.

The system status unit 32 provides status input regarding the internal system 49 to the internal encryption chip 45. In one implementation of this embodiment, the system status unit 32 tracks events that occur in the internal system 49. In another implementation of this embodiment, the system status unit 32 time stamps data that is input and/or output to and/or from the internal system 49. In another implementation of this embodiment, the system status unit 32 time stamps data that is input and/or output to and/or from the internal data storage unit 34.

The system control unit 33 includes a physical interface, such as a parallel or serial bus interface. The system control unit 33 operates on the internal system 49. In one implementation of this embodiment, the system control unit 33 downloads status data from the system status unit 32 to the internal encryption chip 45. In another implementation of this embodiment, the system control unit 33 is a microprocessor bus which performs a handshake according to an embedded protocol. In yet another implementation of this embodiment, the embedded protocol is a logic protocol used to configure programmable devices and the system control unit 33 modifies firmware in the internal system 49 based on software (not shown) executing on processors (not shown) in the system control.

The internal data storage unit 34 stores monitor data received from the system control unit 33 and the internal encryption chip 45. In one implementation of this embodiment, the internal data storage unit 34 stores test data output received from the protected device 30.

In one implementation of this embodiment, one or more of the alternate interface 36, user input unit 37, user display 38 and data storage 39 are not included in the system 10. In one implementation of this embodiment, one or more of the system status unit 32, the system control unit 33, and internal data storage unit 34 are not included in the system 10.

In another implementation of this embodiment, the internal encryption chip 45 encrypts test data output and encrypts monitor data output and the external encryption chip 40 decrypts test data output and monitor data output based on the shared password.

In yet another implementation of this embodiment, the internal encryption chip 45 encrypts test data output and the external encryption chip 40 decrypts test data output based on the shared password.

In yet another implementation of this embodiment, the external encryption chip 40 encrypts tests data input and monitor data input and the internal encryption chip 45 decrypts test data input and monitor data input based on the shared password.

In yet another implementation of this embodiment, the external encryption chip 40 encrypts tests data input and the internal encryption chip 45 decrypts test data input based on the shared password.

In yet another implementation of this embodiment, the internal encryption chip 45 encrypts test data output and decrypts test data input and the external encryption chip 40 encrypts test data input and decrypts test data output based on the shared password.

In yet another implementation of this embodiment, the internal encryption chip 45 encrypts monitor data output and decrypts monitor data input and the external encryption chip 40 encrypts monitor data input and decrypts monitor data output based on the shared password.

In yet another implementation of this embodiment, the internal encryption chip 45 encrypts test data output and monitor data output and decrypts test data input and monitor data input. In this case, the external encryption chip 40 encrypts test data input and monitor data input and decrypts test data output and monitor data output.

In yet another implementation of this embodiment, the internal encryption chip 45 and the external encryption chip 40 are manufactured together and embedded with the shared password during manufacturing. The shared password is the same password. In another implementation of this embodiment, the shared password is embedded in the internal encryption chip 45 and the external encryption chip 40 during an initialization process during which the internal encryption chip 45 and the external encryption chip 40 are modified to be compatible.

In yet another implementation of this embodiment, the test access port 25 is a joint test access group (JTAG) port, the signals are generated by JTAG test equipment 35, and the external key device 12 is adapted to communicate encrypted signals through the JTAG port according to IEEE 1149.1 standards and IEEE 1532 standards.

In yet another implementation of this embodiment, the test access port 25 is a joint test access group (JTAG) port, the signals are generated by JTAG test equipment 35, and the internal key device 15 is adapted to communicate encrypted signals through the JTAG port according to IEEE 1149.1 standards. In yet another implementation of this embodiment, the test access port 25 is a port equivalent to the joint test access group (JTAG) port. In yet another implementation of this embodiment, the test access port 25 is an Ethernet port. In yet another implementation of this embodiment, the protected device is a JTAG device. In yet another implementation of this embodiment, the protected device is a chain of JTAG devices. In yet another implementation of this embodiment, the internal key device 15 and the protected device 30 are located under a protective security coating, located within a multi-chip-module, located within a closed integrated circuit package, and combinations thereof.

Figure 2:
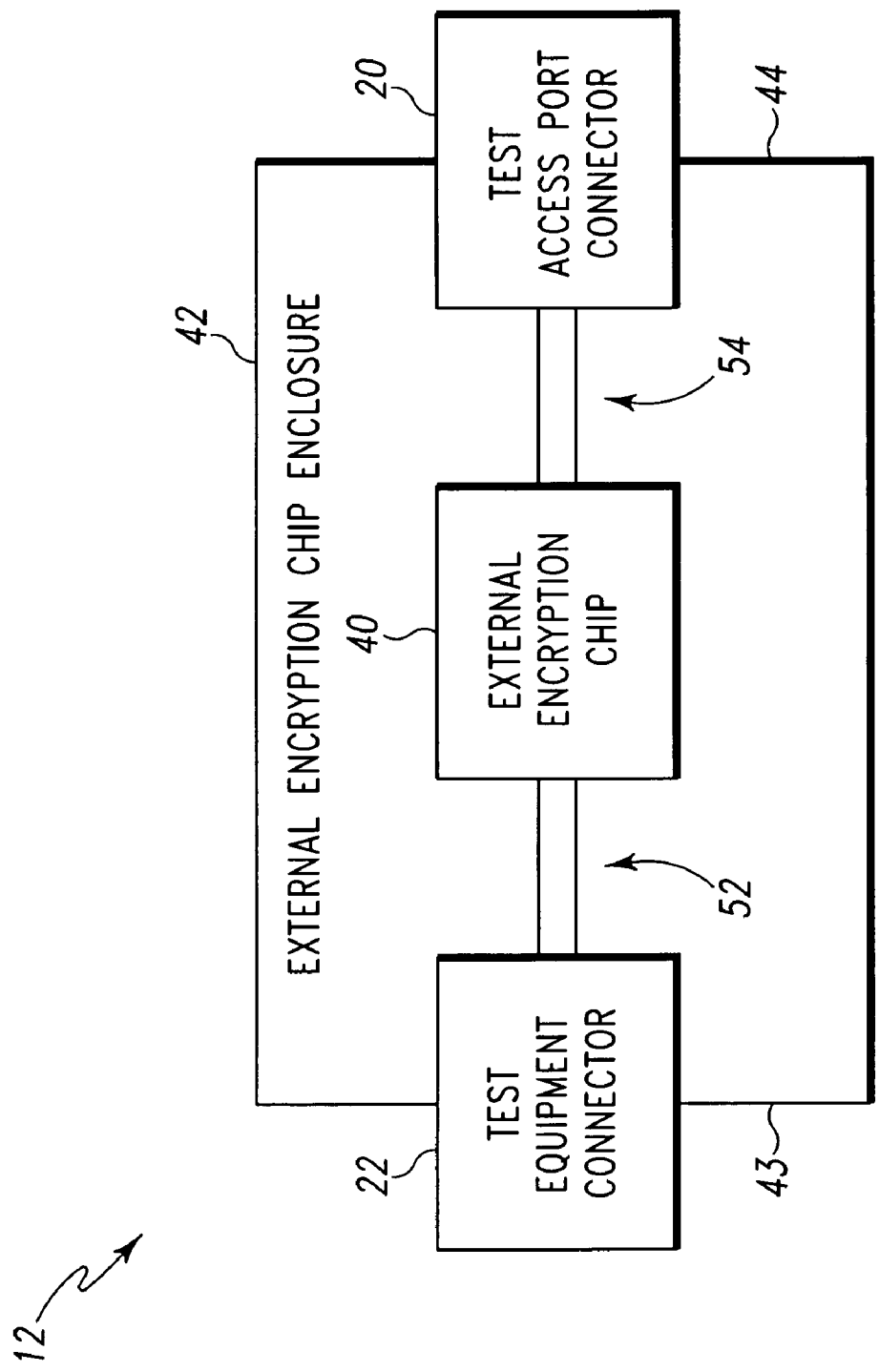
FIG. 2 is a block diagram of one embodiment of an external key device.

FIG. 2 is a block diagram of one embodiment of the external key device 12. The external key device 12 includes an external encryption chip 40, a test access port connector 20, and a test equipment connector 22. The external encryption chip 40, the test connections 52 and access port connections 54 are located within an external encryption chip enclosure 42. In one implementation of this embodiment, the test connections 52 and access port connections 54 are one or more of trace lines, lead lines, wires and the like. The test equipment connector 22 extends through a surface 43 in the external encryption chip enclosure 42. The test access port connector 20 extends through a surface 44 in the external encryption chip enclosure 42.

The test access port connector 20 is adapted to mate with the test access port 25 (FIG. 1). The test equipment connector 22 adapted to communicatively couple to the test equipment 35 (FIG. 1). Test connections 52 communicatively couple the external encryption chip 40 to the test equipment connector 22. Access port connections 54 communicatively couple the external encryption chip 40 to the test access port connector 20.

In one implementation of this embodiment, the external encryption chip 40 is adapted to encrypt at least a portion of signals input from the test equipment connector 22 via test connections 52. Such encryption can be implemented by Advanced Encryption Standard, Data Encryption Standard, Escrowed Encryption Standard or equivalent. In one embodiment of such an implementation, the signals encrypted by the external encryption chip 40 are test data input signals and/or monitor data input signals.

In another implementation of this embodiment, the external encryption chip 40 is adapted to decrypt at least a portion of signals output from the test access port 25 (FIG. 1) via access port connections 54. In yet another implementation of this embodiment, the external encryption chip 40 is adapted to encrypt at least a portion of signals input from the test equipment connector 22 and to decrypt at least a portion of signals output from the test access port 25.

In an exemplary case, the test data input signals include a test request signal to initiate a test of the protected device 30. In this exemplary case, the test data output signals include test results generated by the protected device 30 when the protected device 30 performs the test requested by the test request signals.

In yet another implementation of this embodiment, the external encryption chip enclosure 42 includes ports that provide communication paths to one or more of the alternate interface 36, the user input unit 37, the user display 38 and the data storage unit 39 (FIG. 1).

Figure 3:
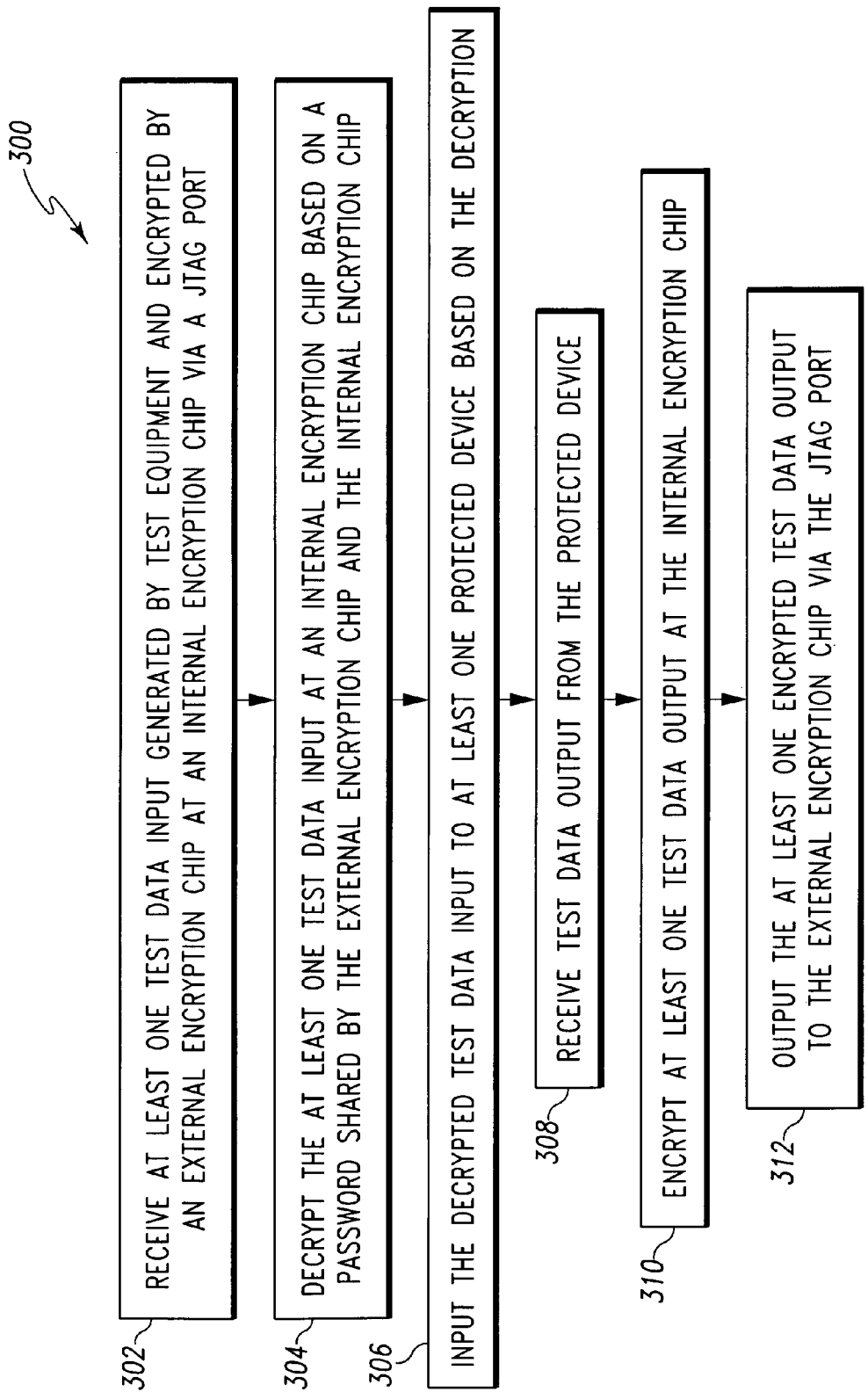
FIG. 3 is a flow diagram of one embodiment of a method to control access to at least one protected device through a test access port.

FIG. 3 is a flow diagram of one embodiment of a method to control access to at least one protected device 30 through a test access port 25. The particular embodiment of method 300 shown in FIG. 3 is described here as being implemented for use with the system 10 described above in connection with FIG. 1 in which the test access port 25 is a joint test access group (JTAG) port 25, the signals are generated by JTAG test equipment 35, and the external key device 12 is adapted to communicate encrypted signals through the JTAG port according to IEEE 1149.1 standards and/or IEEE 1532 standards. The particular embodiment of method 300 shown in FIG. 3 is described here as being implemented for use with the system 10 shown in FIG. 1, to control access of the test equipment 35 to the protected device 30. The internal key device 15 implements software (not shown) in the internal key device 15 to execute the steps in method 300.

At block 302, internal encryption chip 45 receives at least one test data input generated by test equipment 35 and encrypted by the external encryption chip 40 via the JTAG port 25. In one implementation of this embodiment, the test access port 25 is not a JTAG port. In another implementation of this embodiment, the internal encryption chip 45 receives at least one test data input generated the alternate interface 36, and/or the user input unit 37 and encrypted by the external encryption chip 40 via the JTAG port 25.

At block 304, the internal encryption chip 45 decrypts the at least one test data input based on a password shared by the external encryption chip 40 and the internal encryption chip 45. The shared password is stored in the internal key device 15. The internal encryption chip 45 implements a process, such as a handshake process, to determine if the external encryption chip 40 and the internal encryption chip 45 share the password. If it is determined that the external encryption chip 40 and the internal encryption chip 45 share the password, the internal encryption chip 45 decrypts the test data input.

At block 306, the internal encryption chip 45 inputs the decrypted test data input to at least one protected device 30 based on the decryption implemented at block 304. The decrypted test data is input to protected device 30 via the joint test access group (JTAG) interface (I/F) port 47.

At block 308, the internal encryption chip 45 receives test data output from the protected device 30. At block 310, the internal encryption chip 45 in the internal key device 15 encrypts at least one test data output. In one implementation of this embodiment, the internal encryption chip 45 in the internal key device 15 encrypts at least one test data output based on the shared password as described above with reference to block 304. Block 310 is optional since the handshake process implemented at block 304 ensures that the protected device 30 is protected from unauthorized test equipment 35, alternate interfaces 36 and/or user input units 37. In another implementation of this embodiment, block 304 is not part of method 300 and block 310 is required in method 300.

At block 312, the internal key device 15 outputs the at least one encrypted test data output to the external encryption chip 40 via the JTAG port 25. In another implementation of this embodiment, the internal encryption chip 45 outputs the at least one encrypted test data output to the external encryption chip 40 via the JTAG port 25. The external encryption chip 40 decrypts the at least one test data output based on the shared password.

In one implementation of this embodiment, the external key device 12 does not encrypt the test data input. In this case, the internal key device 15 inputs the test data input to the protected device 30, which implements the test data input by running a test, generating test data output and outputting the test data output to the internal encryption chip 45. Then the internal encryption chip 45 encrypts the test data output and outputs the encrypted the test data output to the external encryption chip 40 in the external key device 12 via the JTAG port 25. In this manner, the test equipment 35 does not have access to the protected device 30 unless the external encryption chip 40 in the external key device 12 shares a password with the internal key device 15. The external encryption chip 40 decrypts the encrypted test data output only based on a password shared by the external encryption chip 40 and the internal encryption chip 45. Thus, the internal key device 15 controls test equipment 35 access to test data output from at least one protected device 30 through a joint test access group (JTAG) port 25 by receiving test data output, encrypting the test data output, and outputting the encrypted test data output based on a shared password.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system such as internal data storage unit 34 and/or data storage unit 39, at least one input device such as user input unit 37, and at least one output device, such as user display 38. Generally, a processor will receive instructions and data from a read-only memory and/or a random access memory.

Figure 4:
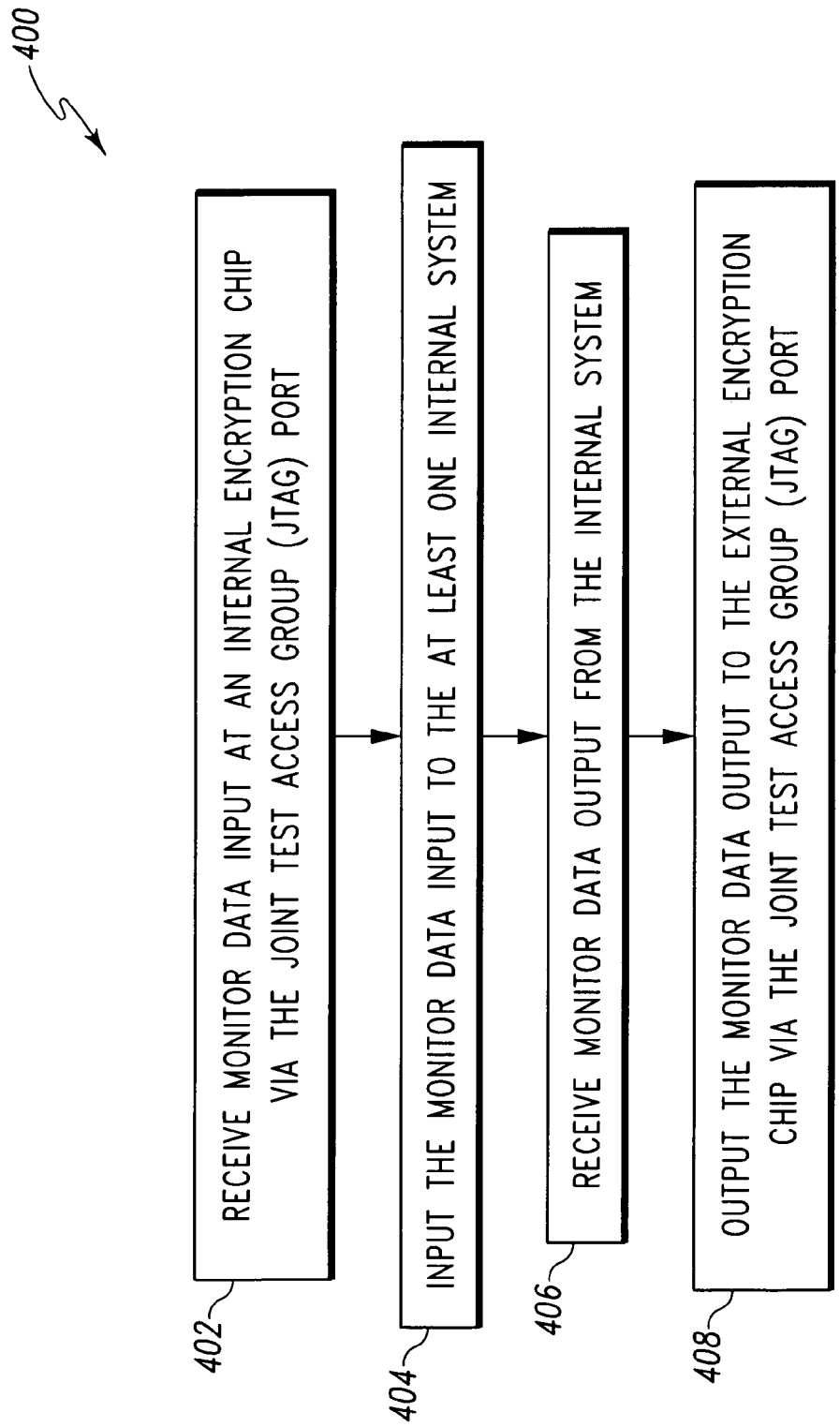
FIG. 4 is a flow diagram of one embodiment of a method to control access to at least one internal system through a test access port

FIG. 4 is a flow diagram of one embodiment of a method to control access to the internal system 49 through a test access port 25. The particular embodiment of method 400 shown in FIG. 4 is described here as being implemented for use with the system 10 described above in connection with FIG. 1 in which the test access port 25 is a joint test access group (JTAG) port 25, and the external key device 12 is adapted to communicate encrypted signals through the JTAG port according to IEEE 1149.1 and/or IEEE 1532 standards. The particular embodiment of method 400 shown in FIG. 4 is described here as being implemented for use with the system 10 of FIG. 1 to control access of the user input 37 and the alternate interface 36 to the internal system 49 via the non/JTAG interface 46, the system status unit 32, the system control unit 33, and/or the internal data storage unit 34 (FIG. 1). The internal key device 15 implements software (not shown) in the internal key device 15 to execute the steps in method 400.

At block 402, the internal encryption chip 45 receives monitor data input generated by the alternate interface 36, and/or the user input unit 37 via the JTAG port 25. In one implementation of this embodiment, the external encryption chip 40 encrypts the monitor data input to the internal encryption chip 45. In another implementation of this embodiment, the test access port 25 is not a JTAG port.

At block 404, the internal encryption chip 45 inputs the monitor data input to the internal system 49 via the system control unit 33 and the non/JTAG interface 49. In an implementation of this embodiment in which the monitor data input is encrypted, the internal encryption chip 45 decrypts the monitor data input based on a password shared by the external encryption chip 40 and the internal encryption chip 45 prior to inputting the monitor data input to the internal system 49. The shared password is stored in the internal key device 15. The internal encryption chip 45 implements a process, such as a handshake process, to determine if the external encryption chip 40 and the internal encryption chip 45 share the password. If it is determined that the external encryption chip 40 and the internal encryption chip 45 share the password, the internal encryption chip 45 decrypts the monitor data input. In another implementation of this embodiment, the monitor data input to the internal system is stored in the internal data storage unit 34. In this case, the internal encryption chip 45 is operable to retrieve the stored monitor data output at a later time.

At block 406, the internal encryption chip 45 receives monitor data output from the internal system 49 via the non/JTAG interface 46 and via the system status unit 32 after the monitor data input is implemented by the internal system 49. In an exemplary case, the monitor data input includes a status update request for one or more components in the internal system 49. In that case, the monitor data output includes the status of the one or more components in the internal system 49. In one implementation of this embodiment, the monitor data output from the internal system 49 is stored in the internal data storage unit 34. In this case, the internal encryption chip 45 is operable to retrieve the stored monitor data output at a later time.

At block 408, the internal encryption chip 45 outputs the monitor data output to the external encryption chip 40 via the joint test access group (JTAG) port 25.

In one implementation of this embodiment, the internal encryption chip 45 in the internal key device 15 encrypts at least one monitor data output based on the shared password and the internal key device 15 outputs the encrypted monitor data output to the external encryption chip 40 via the JTAG port 25. In another implementation of this embodiment, the internal encryption chip 45 outputs the un-encrypted monitor data output to the external encryption chip 40 via the JTAG port 25.

Figure 5:
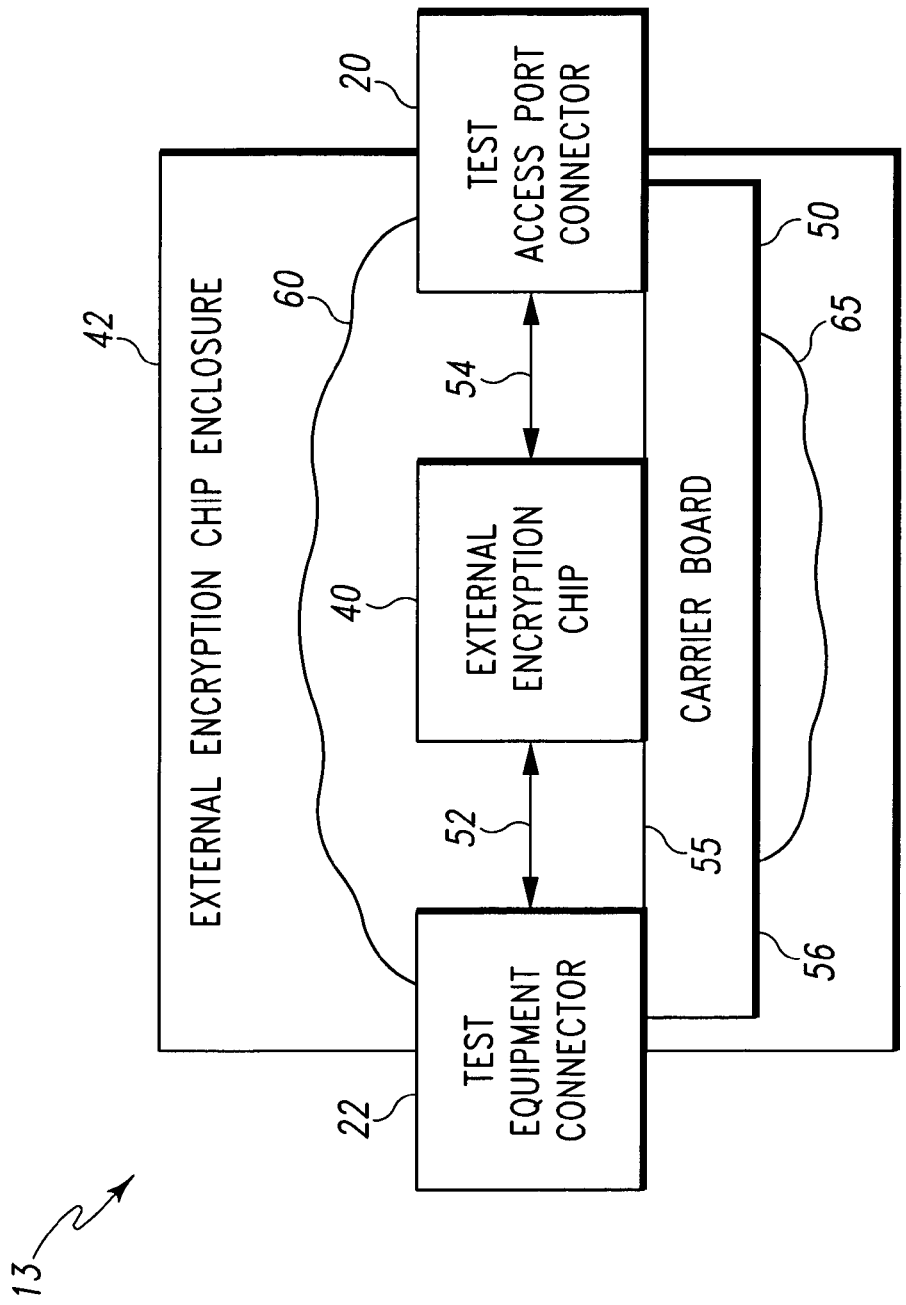
FIG. 5 is a block diagram of one embodiment of an external key device.

FIG. 5 is a block diagram of one embodiment of an external key device 13. The external key device 13 includes the external encryption chip 40, a test access port connector 20, and a test equipment connector 22, as well as a carrier board 50, a top protective security coating 60, and a bottom protective security coating 65. The carrier board 50 is adapted to hold the external encryption chip 40, the test connections 52 communicatively coupling the external encryption chip 40 to the test equipment connector 22 and the access port connections 54 communicatively coupling the external encryption chip 40 to the test access port connector 20. The top protective security coating 60 overlies the external encryption chip 40 and at least partially overlies the top surface 55 of the carrier board, the test connections 52 and the access port connections 54. The bottom protective security coating 65 overlies a bottom surface 56 of the carrier board. The bottom protective security coating 65 opposes the external encryption chip 40 and at least a portion of the top protective security coating 60. The protective security coating 60 and 65 can be made from an opaque material such as a dark encapsulant, an opaque plastic, or an opaque polymer.

In one implementation of this embodiment, the carrier board 50 is a printed circuit board. In another implementation of this embodiment, the carrier board 50 is a printed circuit board in which the test connections 52 and the access port connections 54 are embedded. In yet another implementation of this embodiment, there is only a top protective security coating 60 and the bottom protective security coating 65 is not included in the external key device 13.

In yet another implementation of this embodiment, the external encryption chip enclosure 42 includes ports that provide communication paths to one or more of the alternate interface 36, the user input unit 37, the user display 38 and the data storage unit 39 (FIG. 1).

Figure 6:
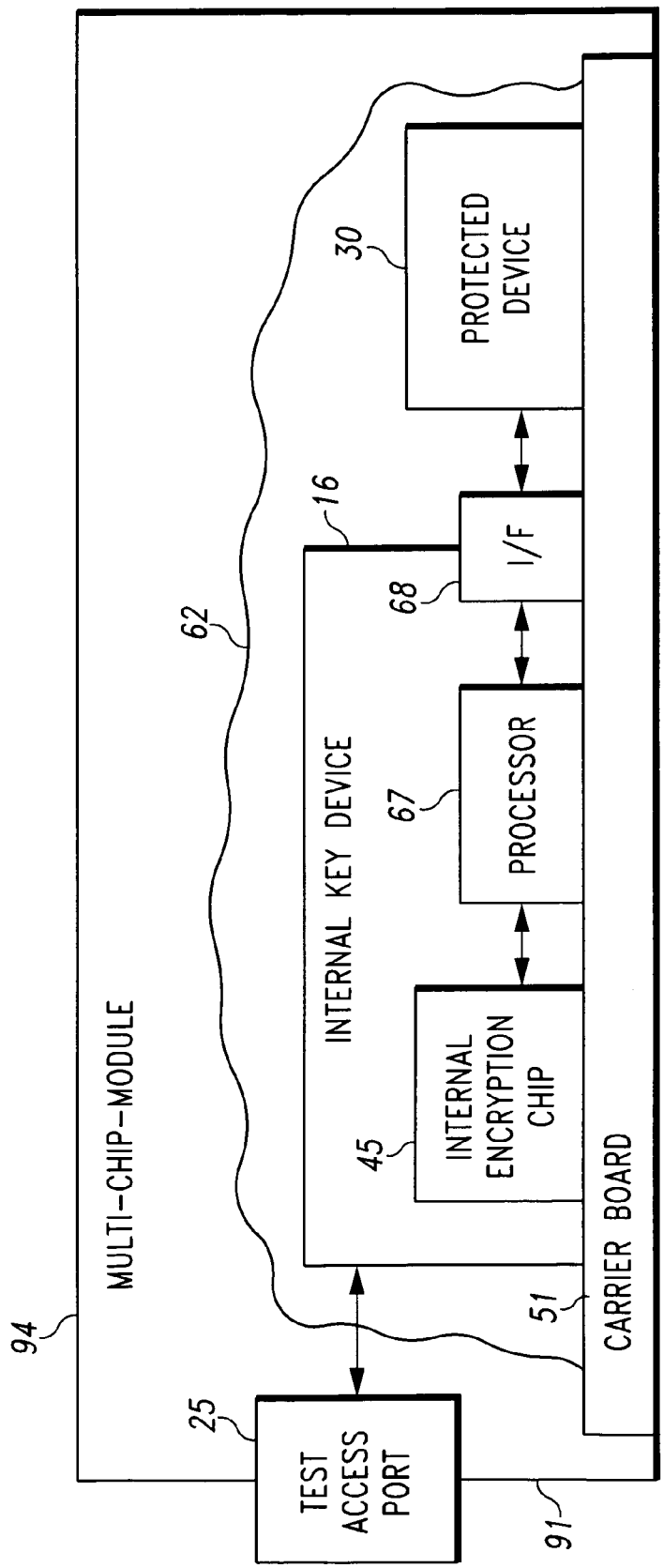
FIG. 6 is a block diagram of one embodiment of the internal key device in a multi-chip-module.

FIG. 6 is a block diagram of one embodiment of the internal key device 16 enclosed in a multi-chip-module 94. The internal key device 16 includes an internal encryption chip 45, a processor 67 and an interface port (I/F) 68. As shown in FIG. 6, a protective security coating 62 overlies the internal key device 16 and the protected device 30 which are positioned on a carrier board 51. The protective security coating 62 can be made from an opaque material such as a dark encapsulant, an opaque plastic, or an opaque polymer.

The internal encryption chip 45 is communicatively coupled to the test access port 25 that extends through the surface 91 of the multi-chip-module 94. The external key device 12 (FIG. 1) is adapted to communicate encrypted signals through the test access port 25 to the internal encryption chip 45 since the test access port 25 is communicatively coupled to both the external encryption chip 40 and the internal encryption chip 45 (FIG. 1).

The internal encryption chip 45 at least one of encrypts test data output and decrypts test data input as described above with reference to method 300 of FIG. 3. In one implementation of this embodiment, the internal encryption chip 45 and the protected device 30 are located on the carried board 51 without an enclosure of the internal key device 16 and without the interface port 68. In another implementation of this embodiment, the internal key device 16 and the protected device 30 are located on the carried board 51 and covered with the protective security coating 62 without being in the multi-chip-module 94. In this case, test access port 25 is positioned on the carrier board 51.

In yet another implementation of this embodiment, the protective security coating 62 overlying the internal key device 16 and the protected device 30 positioned on a carrier board 51 are located within a closed chassis 90 (FIG. 1). In yet another implementation of this embodiment, the protective security coating 62 overlies the protected device 30, the internal key device 15 (FIG. 1), and the internal system 49 (FIG. 1) all positioned on a carrier board 51 and one of located within a closed chassis 90 (FIG. 1) or the multi-chip-module 94.

In one implementation of this embodiment, the test access port 25 is a joint test access group (JTAG) port, the signals communicated to and from the internal key device 16 are generated by JTAG test equipment 35, and the internal key device 16 is adapted to communicate decrypted and/or encrypted signals through a JTAG port according to IEEE 1149.1 standards and/or IEEE 1532 standards.

In another implementation of this embodiment, the processor 67 is not included in the internal key device 16 and the internal encryption chip 45 includes processing capability required to implement system 10 (FIG. 1).

Figure 7:
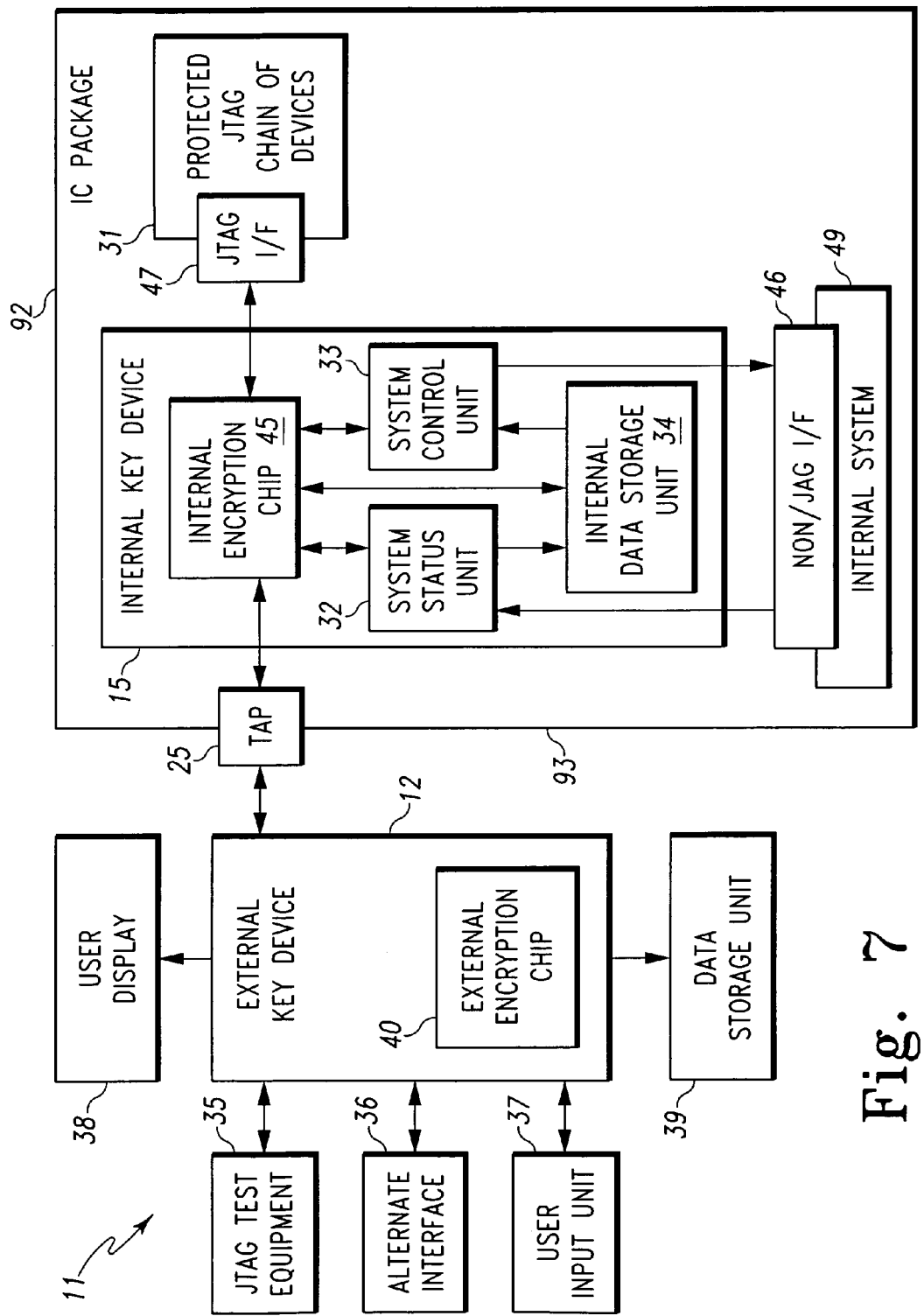
FIG. 7 is a block diagram of one embodiment of a system to protect a protected device and to monitor and to store system status of the internal system In accordance with common practice, the various described features are not drawn to scale but are drawn to emphasize features relevant to the present invention. Reference characters denote like elements throughout figures and text.

FIG. 7 is a block diagram of one embodiment of a system 11 to protect a protected device 31 and to monitor and to store system status of the internal system 49.

In this implementation of the embodiment, the protected device 31 is a protected JTAG chain of devices 31. As shown in FIG. 7, the protected JTAG chain of devices 31 and the internal key device 15 are enclosed in an integrated circuit (IC) package 92. The JTAG test access port 25 extends through the surface 93 of the integrated circuit package 92.

The test access port 25 is a joint test access group (JTAG) port, the signals are generated by JTAG test equipment 35, and the external key device 12 are adapted to communicate encrypted signals through the JTAG port according to IEEE 1149.1 standards and/or IEEE 1532 standards. The internal encryption chip 45 and the external key device 12 are configured as described above with reference to FIG. 1. The internal encryption chip 45 and the external key device 12 function as described above with reference to FIGS. 3 and 4. The internal encryption chip 45 at least one of encrypts test data output and decrypts test data input and the external encryption chip 40 at least one of encrypts test data input and decrypts test data output.

In yet another implementation of this embodiment, a protective security coating 62 (FIG. 6) overlays the internal key device 15, the protected device 30 and the internal system 49 all positioned on a carrier board 51 (FIG. 6) located within the IC package 94. In yet another implementation of this embodiment, the protective security coating 62 (FIG. 6) overlies the internal key device 15 and the protected device 30 but does not overlay the internal system 49 all located within the IC package 94.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An external key device, comprising:
a test access port connector adapted to mate with a test access port;
a test equipment connector adapted to communicatively couple to test equipment; and
an external encryption chip adapted to communicate signals received from the test equipment connector through the test access port to an internal encryption chip,
wherein the internal encryption chip at least one of decrypts at least one test data input from the external encryption chip based on a password shared by the external encryption chip and the internal encryption chip and encrypts at least one test data output from a protected device, and
wherein the external encryption chip at least one of decrypts at least one test data output from the protected device based on the shared password and encrypts at least one test data input generated by the test equipment.

2. The external key device of claim 1, wherein the external key device is further adapted to mate with one of a user input unit and an alternate interface, wherein the internal encryption chip at least one of decrypts at least one monitor data input from the external encryption chip based on the password shared by the external encryption chip and the internal encryption chip and encrypts at least one monitor data output from an internal system, and
wherein the external encryption chip at least one of decrypts at least one monitor data output from the internal system based on the shared password and encrypts at least one monitor data input generated by one of the user input unit and the alternate interface.

3. The external key device of claim 2, wherein the test access port is a joint test access group (JTAG) port, at least a portion of the signals are generated by JTAG test equipment, and the external key device is adapted to communicate encrypted signals through the JTAG port according to one of IEEE 1149.1 standards, IEEE 1532 standards, and IEEE 1149.1 and IEEE 1532 standards.

4. The external key device of claim 1, wherein the test access port is a joint test access group (JTAG) port, the signals are generated by JTAG test equipment, and the external key device is adapted to communicate encrypted signals through the JTAG port according to one of IEEE 1149.1 standards, IEEE 1532 standards, and IEEE 1149.1 and IEEE 1532 standards.

5. The external key device of claim 1, further comprising:
a protective security coating overlying the external encryption chip.

6. The external key device of claim 1, further comprising:
a carrier board adapted to hold the external encryption chip;
test connections communicatively coupling the external encryption chip to the test equipment connector; and
access port connections communicatively coupling the external encryption chip to the test access port connector.

7. The external key device of claim 6, further comprising:
a top protective security coating overlying the external encryption chip and at least partially overlying a top surface of the carrier board, the test connections and the access port connections; and
a bottom protective security coating overlying a bottom surface of the carrier board, wherein the bottom protective security coating opposes the external encryption chip and at least a portion of the top protective security coating.

8. A system to protect a protected device and to monitor an internal system, the system comprising:
a test access port communicatively coupled to an external encryption chip in an external key device; and
an internal key device including an internal encryption chip, wherein the internal encryption chip is communicatively coupled to the protected device and the external encryption chip, and wherein test equipment is communicatively coupled to the protected device via the external key device if the internal encryption chip and the external encryption chip share at least a password.

9. The system of claim 8, further comprising:
a user input unit communicatively coupled to the external encryption chip, the user input unit to provide input data to the internal encryption chip in the internal key device;
a data storage unit communicatively coupled to the external encryption chip to store output received from the internal key device; and
a user display communicatively coupled to the external encryption chip to display output received from the internal key device.

10. The system of claim 9, wherein the internal key device further comprises:

a system status unit communicatively coupled to the internal encryption chip, the system status unit to provide monitor data regarding the internal system to the internal encryption chip;

a system control unit communicatively coupled to the internal encryption chip, the system control unit to provide monitor data to the internal system; and an internal data storage unit communicatively coupled to the internal encryption chip, the system status unit, and the system control unit, the internal data storage unit enabled to store monitor data received from the system status unit, the internal encryption chip and the system control unit, wherein at least one of the test equipment, the user input unit, the data storage unit and the user display is communicatively coupled to at least one of the protected device and the internal system if the internal encryption chip and the external encryption chip share at least a password.

11. The system of claim 8, further comprising:

a protective security coating overlying the internal encryption chip and the protected device, wherein the internal key device and the protected device are one of located within a closed chassis, located within a multi-chip-module, located within a closed integrated circuit package, and combinations thereof.

12. The system of claim 8, wherein the test access port is a joint test access group (JTAG) port, the signals are generated by JTAG test equipment, and the external key device is adapted to communicate encrypted signals through the JTAG port according to one of IEEE 1149.1 standards, IEEE 1532 standards, and IEEE 1149.1 and IEEE 1532 standards.

13. The system of claim 8, wherein the internal encryption chip at least one of encrypts test data output and decrypts test data input and wherein the external encryption chip at least one of encrypts test data input and decrypts test data output.

14. The system of claim 8, wherein the internal encryption chip at least one of encrypts monitor data output and decrypts monitor data input and wherein the external encryption chip at least one of encrypts monitor data input and decrypts monitor data output.

15. The system of claim 8, wherein the test access port is one of a joint test access group (JTAG) port or equivalent port.

16. A method to control access to an internal system and at least one protected device through a joint test access group (JTAG) port, the method comprising:

receiving test data input generated by test equipment at an internal encryption chip via an external key device communicatively coupling the test equipment to the joint test access group (JTAG) port;

inputting the test data input to the at least one protected device;

receiving test data output from the protected device; and outputting the test data output to the external encryption chip via the joint test access group (JTAG) port, wherein the internal encryption chip at least one of decrypts at least one test data input from the external encryption chip based on a password shared by the external encryption chip and the internal encryption chip and encrypts at least one test data output from the protected device, and wherein the external encryption chip at least one of decrypts at least one test data output from the protected device based on the shared password and encrypts at least one test data input generated by the test equipment.

17. The method of claim 16, further comprising:

receiving the at least one test data input generated by test equipment and encrypted by an external encryption chip at the internal encryption chip;

decrypting the at least one test data input at the internal encryption chip based on the shared password; and inputting the decrypted test data input to the at least one protected device based on the decryption.

18. The method of claim 16, further comprising:

encrypting the at least one test data output at the internal encryption chip based on the shared password; and outputting the at least one encrypted test data output to the external encryption chip.

19. The method of claim 16, further comprising:

receiving the at least one test data input generated by test equipment and encrypted by an external encryption chip at the internal encryption chip;

decrypting the at least one test data input at the internal encryption chip based on the shared password; and inputting the decrypted test data input to the at least one protected device based on the decryption;

encrypting at least one test data output at the internal encryption chip; and outputting the encrypted test data output to the external encryption chip via the joint test access group (JTAG) port, wherein the external encryption chip decrypts the at least one test data output based on the shared password.

20. The method of claim 16, the method further comprising:

receiving monitor data input at an internal encryption chip via the joint test access group (JTAG) port;

inputting the monitor data input to the at least one internal system;

receiving monitor data output from the internal system; and outputting the monitor data output to the external encryption chip via the joint test access group (JTAG) port, wherein the internal encryption chip at least one of decrypts at least one monitor data input from the external encryption chip based on a password shared by the external encryption chip and the internal encryption chip and encrypts at least one monitor data output from the internal system, and wherein the external encryption chip at least one of decrypts at least one monitor data output from the internal system based on the shared password and encrypts at least one monitor data input generated by the monitor equipment.

* * * * *